United States Patent Office 3,290,408
Patented Dec. 6, 1966

3,290,408
POLYMERIC ADHESIVE COMPOSED OF PYROLYZED METALLIC SALTS OF DIVINYL BENZENE AND ACRYLIC ACID COPOLYMERS, AND A RESINOUS BINDER
Herbert A. Pohl, Princeton, N.J., assignor to Sci-Tech Corporation, Princeton, N.J., a corporation of New Jersey
No Drawing. Filed Dec. 10, 1962, Ser. No. 243,632
8 Claims. (Cl. 260—836)

This application is a continuation-in-part of my co-pending application, Serial No. 195,397, filed May 17, 1962, now abandoned.

This invention relates to a composition containing a pyropolymer doped with certain metallic ions which composition is useful in operations wherein the property of withstanding high temperatures is of value.

It has long been a goal to develop organic polymers which would withstand temperatures above 350° C. without affecting the dimension stability of the polymer or the bond between the polymer and other materials, particularly metals, affixed to it. Previous organic polymers have not been able to withstand much exposure to temperatures in excess of 350° C.

It is an object of the present invention to obtain a polymer composition which is extremely resistant to the effects of high temperatures.

Another object of the invention is the obtention of an adhesive polymer composition comprising from about 100% to about 80% of a pyropolymer prepared by pyrolyzing an organo-metallic compound containing from about 10% to about 100%, based on the combining or complexing property of the organo-metallic compound, of a metal selected from the group consisting of metals of Group I-A, metals of Group II-A, and metals of Group IV-A of the Periodic Table, and from about 0% to about 20% of a thermosetting or possibly a thermoplastic resin binder.

Another object of the invention is to obtain a high temperature resistant adhesive polymer composition comprising from about 100% to about 80% of a pyropolymer prepared by pyrolyzing a metal salt of an organic acid which decomposes thermally to give a carbonaceous residue containing most of the metal originally present, said metal being selected from the group consisting of metals of Group I-A, metals of Group II-A, and metals of Group IV-A of the Periodic Table, and from about 0% to about 20% of a thermally hardenable resin binder.

A further object of the present invention is to obtain a high temperature resistant composition comprising from about 95% to about 80% of a pyropolymer prepared by pyrolyzing a cation exchange resin containing from about 10% to about 100% of the metal binding capacity of the resin, of a metal selected from the group consisting of sodium, calcium and thorium and from about 5% to about 20% of a thermosetting resin binder.

A still further object of the invention is to obtain a high temperature resistant adhesive polymer composition comprising a pyropolymer prepared by incompletely pyrolyzing a metal salt of an organic acid which decomposes thermally to give a carbonaceous residue containing most of the metal originally present, said metal being selected from the group consisting of metals of Group I-A, metals of Group II-A, and metals of Group IV-A of the Periodic Table, said pyrolysis being terminated at a point wherein said pyropolymer remains thermoplastic.

A yet other object of the invention is the development of a method of bonding utilizing the above polymer compositions.

These and other objects of the invention will become more apparent as the description thereof proceeds.

I have found that a moldable polymer composition comprising from about 100% to about 80% of a pyropolymer prepared by pyrolyzing an organo-metallic compound containing from about 10% to about 100%, based on the combining or complexing property of the organo-metallic compound, of a metal selected from the group consisting of metals of Group I-A, metals of Group II-A, and metals of Group IV-A of the Periodic Table, and preferably sodium, calcium and thorium and from about 0% to about 20% of a thermally hardenable resin binder when cured at temperatures of 100° C. or higher, preferably 150° C. to 200° C., under pressure forms an extremely stable adhesive bond. The molded polymer composition remains dimensionally stable when subjected to temperatures in excess of 350° C. The excellent high temperature stability of the molded polymer composition of the invention is effective at temperatures far in excess of 350° C. upon to temperatures in the order of 1200° C. under non-oxidative conditions.

The polymer compositions of the invention are of particular interest in the development of adhesive bonds resistant to temperatures above 350° C. In addition, due to the high temperature resistance of the polymer compositions, they are useful as ablation compounds. The polymer compositions of the invention are conductive and have a specific conductivity of 0 to $10^{+3}$ mhos and are also useful in the construction of fuel cells, especially as fuel cell electrodes. As an added feature, the polymer compositions have a high degree of radiation resistance and are useful in and around equipment undergoing a high degree of radiation, such as atomic reactors.

The polymer composition of the invention is prepared by mixing about 0% to about 20% of a thermally hardenable resin binder such as, for example, a phenolic resin with about 100% to about 80% of a pyropolymer doped with a metal selected from the group consisting of metals of Group I-A, metals of Group II-A, and metals of Group IV-A of the Periodic Table, and preferably sodium, calcium and thorium. Among the various metals of Groups I-A, II-A and IV-A which can be utilized are lithium, sodium, potassium, rubidium, cesium from Group I-A, beryllium, magnesium, calcium, strontium, barium, radium from Group II-A, and titanium, zironium, hafnium, thorium from Group IV-A. While all of these metals can be utilized, it has been found that the high temperature resistance coupled with strong adhesion is found especially with sodium, calcium and thorium.

For the preparation of the pyropolymer doped with metal, it is preferable to employ a cation exchange resin such as those containing carboxylate or sulfonic acid groups, in the acid form. The resin is treated with an aqueous solution containing the desired metal in soluble form. The metal content is preferably from about 10% to about 100% of the metal binding capacity of the cation exchange resin. This cation exchange resin in salt form is then subjected to an oxidative pyrolization at a temperature of between 250° C. and 350° C., preferably at about 300° C., until the mass has charred and retains a relatively constant weight. Thereafter, the partially pyrolyzed resin is subjected to pyrolization at a temperature between about 500° C. and about 700° C., preferably about 600° C., in an inert atmosphere, such as an atmosphere of nitrogen, helium or carbon dioxide until the pyropolymer again reaches constant weight. The pyropolymer is then cooled, ground to the desired fineness and admixed with the resin binder. While any commercial cation exchange resin may be employed, a resin prepared by the copolymerization of acrylic acid or methacrylic acid and divinylbenzene is preferred.

Other metallic salts of organic acids which decompose upon pyrolization, either oxidative pyrolization or non-oxidative pyrolization, to give a carbonaceous residue of pyropolymer containing most of the original metal or other metal-containing derivatives of organic compounds, such as metal salts of phenolic compounds or metal complexes which decompose upon either oxidative or non-oxidative pyrolization to give a carbonaceous residue of pyropolymer containing most of the original metal, may also be employed for the pyropolymer doped with metal. Such pyropolymers may be prepared by utilizing as a starting material the neutralized or partially neutralized metal salt of an organic acid whose molecular weight is at least 4 times the molecular weight of the metal present in neutralized or partially neutralized form. Among such acids are, for example, carboxymethylcellulose, lignins, sugar acids, alginic acid, naphthenic acid, polymethacrylic acid, oleic acid, linoleic acid, naphthalene sulfonic acids, phenol, etc. The metal salts, preferably the sodium and potassium salts, of such acids are subjected to a pyrolization, preferably oxidative at a temperature between 250° C. and 400° C., preferably at about 350° C., until the mass has charred and retains a relatively constant weight. Thereafter the partially pyrolized polymer is subject to pyrolization at a temperature between about 500° C. and 700° C., preferably about 600° C., in an inert atmosphere until the pyropolymer again reaches constant weight. The pyropolymer is then cooled, ground to the desired fineness and admixed with the resin binder.

It is also possible under some circumstances to stop the final stage of pyrolization of a pyropolymer before constant weight is effected and to obtain a pyropolymer which is thermally moldable in itself without additional resin binders.

Finally, it is also possible to utilize as a pyropolymer doped with metal, an organic compound capable of forming organo-metallic complexes, such as anthracene compounds, which undergo oxidative pyrolysis to give a pyropolymer containing most of the original metal.

For the resin binder to be employed, all types can be utilized. It is preferable, however, to use resins of the thermosetting type, especially phenolic resins, particularly moisture-free commercial phenolic thermosetting resins.

However, other thermally hardenable resins can be utilized, similarly the so-called "three-dimensional" resins such as urea-formaldehyde resins, diallyl phthalate resins, epoxy resins and cross-linking resins. It is also possible to utilize thermoplastic resins such as polystyrene resins. When utilizing thermoplastic resins, care must be taken to confine the resin at the temperature at which the composition is molded or set.

In preparing formed objects from the polymer composition of the invention, where the purpose is not to effect an adhesive bond, it is necessary to use a mold release agent since otherwise the composition on curing metal forms a bond between the wall of the form and the resin which is stronger than the molded article.

The following examples enable those skilled in the art to better comprehend my invention. It is readily apparent, however, that other expedients may be employed without departing therefrom.

*Example I*

(a) *Preparation of pyropolymer.*—Granules of a cation exchange resin prepared by the copolymerization of methacrylic acid and divinylbenzene were treated with an excess of an aqueous solution of sulfuric acid. Thereafter the resin was washed with water and treated with a solution of sodium hydroxide in sufficient concentration so that the resin picked up about 50% of sodium per theoretical combining capacity of resin. The resin was then washed with water and dried.

The dried granules of the sodium salt form of the cation exchange resin were placed in a small rotating kiln and roasted while passing an excess of air therethrough at 300° C. until the weight became constant.

Thereafter, the temperature was raised to 600° C. while passing nitrogen therethrough until the weight again became constant. The pyropolymer doped with sodium was then cooled and ground to pass 40 mesh.

(b) *Preparation of the polymer composition.*—90 parts by weight of the pyropolymer doped with sodium, obtained above, was mixed with 10 parts by weight of a moisture-free commercial phenolic thermosetting resin.

This polymer composition cures at about 150° C. under conventional molding pressures to give molded objects which retain their shape and adhesive bonds at temperatures in excess of 350° C. Under non-oxidative atmospheric conditions, the adhesive bond was stable up to about 1200° C.

*Example II*

(a) *Preparation of the pyropolymer.*—Granules of a cation exchange resin prepared by copolymerization of acrylic acid and divinylbenzene were prepared in the acid form as in Example I and treated with an aqueous solution of calcium chloride until a pickup of about 25% of calcium per theoretical combining capacity of resin was obtained. The resin was washed and dried and subjected to pyrolysis under the same conditions as in Example I.

(b) *Preparation of the polymer composition.*—85 parts by weight of the pyropolymer doped with calcium obtained above was mixed with 15 parts by weight of a commercial phenolic thermosetting resin. The cured polymer composition had similar properties to that of Example I.

*Example III*

A pyropolymer doped with thorium was prepared similarly as in Example I, utilizing a solution of thorium nitrate. This pyropolymer when admixed with 10 parts by weight of a phenolic thermosetting resin similarly as in Example I had almost identical properties on curing.

*Example IV*

(a) *Preparation of pyropolymer.*—A sodium salt of naphthenic acid was placed in a small rotating kiln and roasted while passing an excess of air therethrough at 350° C. for a period of 24 hours, at which time the weight remained constant.

Thereafter, the temperature was raised to 600° C. while passing helium therethrough for a period of two hours, at which time the weight remained constant. The pyropolymer doped with sodium was then cooled and ground to pass 40 mesh.

(b) *Preparation of the polymer composition.*—90 parts by weight of the pyropolymer doped with sodium, as prepared by part (a) above, was mixed with 10 parts by weight of a moisture-free commercial hardenable urea-formaldehyde resin.

This polymer composition cures at about 175° C. under conventional molding pressures to give molded objects which retain their shape and adhesive bonds at temperatures in excess of 350° C.

The preceding examples are illustrative of the invention. They are not, however, to be deemed limitative as other expedients known to the art may be employed without departing from the body of the invention or the scope of the appended claims.

I claim:

1. An adhesive polymer composition comprising from about 95% to about 80% of a pyropolymer prepared by pyrolyzing at temperatures from 250° C. up to about 700° C. a cation exchange resin composed of a copolymerization product of divinyl benzene with a member selected from the group consisting of acrylic acid and methacrylic acid, said cation exchange resin containing from about 10% to about 100%, based on the combining capacity of the resin, of a metal selected from the group consisting of lithium, sodium, potassium, rubidium, cesium, beryllium, magnesium, calcium, strontium, barium, radium, titanium, zirconium, hafnium and thorium, and from about 5% to about 20% of a resin binder selected from the group consisting of phenolic resins, urea-formaldehyde resins, diallyl phthalate resins, epoxy resins and polystyrene resins, said cation exchange resin pyrolyzing to give a carbonaceous residue containing most of the metal originally present and said pyrolysis being terminated at a point whereby said pyropolymer remains thermoplastic.

2. An adhesive polymer composition according to claim 1, wherein said metal is sodium.

3. An adhesive polymer composition according to claim 1, wherein said metal is calcium.

4. An adhesive polymer composition according to claim 1, wherein said metal is thorium.

5. A method of bonding which comprises placing an adhesive polymer composition comprising from about 95% to about 80% of a pyropolymer prepared by pyrolyzing at temperatures from 250° C. up to about 700° C. a cation exchange resin composed a copolymerization product of divinyl benzene with a member selected from the group consisting of acrylic acid and methacrylic acid, said cation exchange resin containing from about 10% to about 100%, based on the combining capacity of the resin, of a metal selected from the group consisting of lithium, sodium, potassium, rubidium, cesium, beryllium, magnesium, calcium, strontium, barium, radium, titanium, zirconium, hafnium and thorium, and from about 5% to about 20% of a resin binder selected from the group consisting of phenolic resins, urea-formaldehyde resins, diallyl phthalate resins, epoxy resins and polystyrene resins between the surfaces to be bonded and curing at a temperature of about 100° C., said cation exchange resin pyrolyzing to give a carbonaceous residue containing most of the metal originally present, and said pyrolysis being terminated at a point whereby said pyropolymer remains thermoplastic.

6. A method according to claim 5, wherein said metal is sodium.

7. A method according to claim 5, wherein said metal is calcium.

8. A method according to claim 5, wherein said metal is thorium.

References Cited by the Examiner

UNITED STATES PATENTS

| 2,340,111 | 1/1944 | D'Alelio | 260—86.1 |
| 2,557,266 | 6/1951 | Dittmar et al. | 260—851 |

OTHER REFERENCES

Handbook of Chemistry and Physics, 39th edition, Chemical Rubber Publishing Co., Cleveland, Ohio, p. 662 #14 (1957).

Brewster, Organic Chemistry (Second edition), Prentice-Hall, New York, N.Y., 1953.

MURRAY TILLMAN, *Primary Examiner.*

SAMUEL H. BLECH, *Examiner.*

E. J. TROJNAR, P. LIEBERMAN,
*Assistant Examiners.*